United States Patent
Tang et al.

(10) Patent No.: US 11,989,983 B2
(45) Date of Patent: May 21, 2024

(54) DEEP LEARNING OF FAULT DETECTION IN ONBOARD AUTOMOBILE SYSTEMS

(71) Applicant: NEC Laboratories America, Inc., Princeton, NJ (US)

(72) Inventors: LuAn Tang, Pennington, NJ (US); Haifeng Chen, West Windsor, NJ (US); Wei Cheng, Princeton, NJ (US); Junghwan Rhee, Edmond, OK (US); Jumpei Kamimura, South Brunswick, NJ (US)

(73) Assignee: NEC Corporation, Tokyo (JP)

( * ) Notice: Subject to any disclaimer, the term of this patent is extended or adjusted under 35 U.S.C. 154(b) by 349 days.

(21) Appl. No.: 17/241,481

(22) Filed: Apr. 27, 2021

(65) Prior Publication Data

US 2021/0350636 A1    Nov. 11, 2021

Related U.S. Application Data (60) Provisional application No. 63/021,291, filed on May 7, 2020.

(51) Int. Cl.
| | |
|---|---|
| *G07C 5/08* | (2006.01) |
| *B60W 50/02* | (2012.01) |
| *B60W 50/035* | (2012.01) |
| *B60W 50/038* | (2012.01) |
| *G06N 3/044* | (2023.01) |

(Continued)

(52) U.S. Cl.
CPC ......... *G07C 5/085* (2013.01); *B60W 50/0205* (2013.01); *B60W 50/035* (2013.01); *B60W 50/038* (2013.01); *G06N 3/044* (2023.01); *G06N 3/045* (2023.01); *G06N 3/08* (2013.01); *G06N 3/088* (2013.01); *G07C 5/008* (2013.01);

(Continued)

(58) Field of Classification Search
None
See application file for complete search history.

(56) References Cited

U.S. PATENT DOCUMENTS

| | | | | |
|---|---|---|---|---|
| 5,414,645 A | * | 5/1995 | Hirano | F02D 41/22 701/29.1 |
| 11,220,999 B1 | * | 1/2022 | Cheng | F03D 80/88 |

(Continued)

FOREIGN PATENT DOCUMENTS

| | | | | |
|---|---|---|---|---|
| DE | 19725567 A1 | * | 1/1998 | ......... F02D 41/1456 |

OTHER PUBLICATIONS

Machine translation of DE 19725567 (Year: 1998).*

(Continued)

*Primary Examiner* — Christian Chace
*Assistant Examiner* — Scott R Jagolinzer
(74) *Attorney, Agent, or Firm* — Joseph Kolodka (57) ABSTRACT

Methods and systems for vehicle fault detection include collecting operational data from sensors in a vehicle. The sensors are associated with vehicle sub-systems. The operational data is processed with a neural network to generate a fault score, which represents a similarity to fault state training scenarios, and an anomaly score, which represents a dissimilarity to normal state training scenarios. The fault score is determined to be above a fault score threshold and the anomaly score is determined to be above an anomaly score threshold to detect a fault. A corrective action is performed responsive the fault, based on a sub-system associated with the fault.

13 Claims, 6 Drawing Sheets

(51) Int. Cl.
    *G06N 3/045*     (2023.01)
    *G06N 3/08*     (2023.01)
    *G06N 3/088*     (2023.01)
    *G07C 5/00*     (2006.01)

(52) U.S. Cl.
    CPC ....... *G07C 5/0808* (2013.01); *B60W 2710/06* (2013.01); *B60W 2710/18* (2013.01)

(56) References Cited

U.S. PATENT DOCUMENTS

| | | | |
|---|---|---|---|
| 11,449,587 B2* | 9/2022 | Fong | G06V 40/172 |
| 2019/0138423 A1* | 5/2019 | Agerstam | G06F 18/21 |
| 2020/0364579 A1* | 11/2020 | Misu | G06N 3/084 |
| 2021/0256257 A1* | 8/2021 | Taccari | G06N 3/08 |

OTHER PUBLICATIONS

Cheng et al., "Meta multi-task learning for sequence modeling", Proceedings of the AAAI Conference on Artificial Intelligence. vol. 32, No. 1. Apr. 27, 2018, pp. 5070-5077.

Kirsch et al., "Modular networks: Learning to decompose neural computation", 32nd Conference on Neural Information Processing System. vol. 31. Dec. 2018, pp. 2408-2418.

\* cited by examiner

DEEP LEARNING OF FAULT DETECTION IN ONBOARD AUTOMOBILE SYSTEMS

RELATED APPLICATION INFORMATION

This application claims priority to U.S. Patent Application No. 63/021,291, filed on May 7, 2020, incorporated herein by reference in its entirety. This application is related to U.S. patent application Ser. No. 17/241,430, filed Apr. 27, 2021, which is incorporated by reference herein in its entirety.

BACKGROUND

Technical Field

The present invention relates to fault detection in cyber-physical systems, and, more particularly, to the use sensor data from electronic control units on a vehicle to detect faults in the vehicle.

Description of the Related Art

Vehicles are complex systems and including a variety of different functional components, such as the engine, battery, transmission, etc. Faults can lead to substantial safety problems and repair costs.

SUMMARY

A method for vehicle fault detection includes collecting operational data from sensors in a vehicle. The sensors are associated with vehicle sub-systems. The operational data is processed with a neural network to generate a fault score, which represents a similarity to fault state training scenarios, and an anomaly score, which represents a dissimilarity to normal state training scenarios. The fault score is determined to be above a fault score threshold and the anomaly score is determined to be above an anomaly score threshold to detect a fault. A corrective action is performed responsive the fault, based on a sub-system associated with the fault.

A vehicle includes sensors, each associated with a vehicle sub-system, a hardware process, and a memory that stores computer program code. When executed by the hardware processor, the computer program code causes the hardware processor to collect operational data from the sensors, to process the operational data with a neural network to generate a fault score, which represents a similarity to fault state training scenarios, and an anomaly score, which represents a dissimilarity to normal state training scenarios, to determine that the fault score is above a fault score threshold and that the anomaly score is above an anomaly score threshold to detect a fault, and to trigger a corrective action responsive the fault, based on a sub-system associated with the fault.

A vehicle includes sensors, each associated with a vehicle sub-system, a hardware process, and a memory that stores computer program code. When executed by the hardware processor, the computer program code causes the hardware processor to collect operational data from the sensors, including combining features extracted from raw sensor data with a sensor correlation graph that represents groups of related sub-systems, to process the operational data with a neural network, which includes a fully connected layer to generate a fault score and an autoencoder to generate an anomaly score, to determine that the fault score is above a fault score threshold and that the anomaly score is above an anomaly score threshold to detect a fault, and to trigger a corrective action responsive the fault, based on a sub-system associated with the fault. The fault score represents a similarity to fault state training scenarios and the anomaly score represents a dissimilarity to normal state training scenarios;

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Modern vehicles are equipped with a variety of electronic control units (ECUs), each of which may control a small operational unit of the vehicle, and may report the state of the operational unit. Faults in the vehicle's systems may be predicted and prevented based on data from the ECUs, which can prevent damage to the vehicle and loss of life. Using time series information generated by the ECUs, faults in the vehicle may be predicted for a given time period, with the fault being labeled as to a likely vehicle sub-system that is responsible.

This may be performed using a trained neural network model, using a first set of training data, $S_n$, which represents time series information from ECUs under normal operating conditions, and $S_f$, which represents time series information from the ECUs under a fault operating condition. The trained neural network model may be used to provide labels for new time series information $S_i$ from the ECUs of a car i, during a time period from $t_i$ to $(t_i+\sigma_t)$, where $\sigma_t$ is the duration of the prediction window. The trained neural network model may further be used to provide a fault label that may identify a sub-system in the vehicle where the fault is likely to occur.

Time series information may be streamed from the ECUs in real time, providing current information on the state of the vehicle and its sub-systems. The model that processes this information may be implemented in the vehicle itself, making low-latency determinations. The model may be trained remotely, for example in a cloud-based system that gathers ECU time series information from may different vehicles, and may then be distributed to the vehicles for use.

Figure 2:
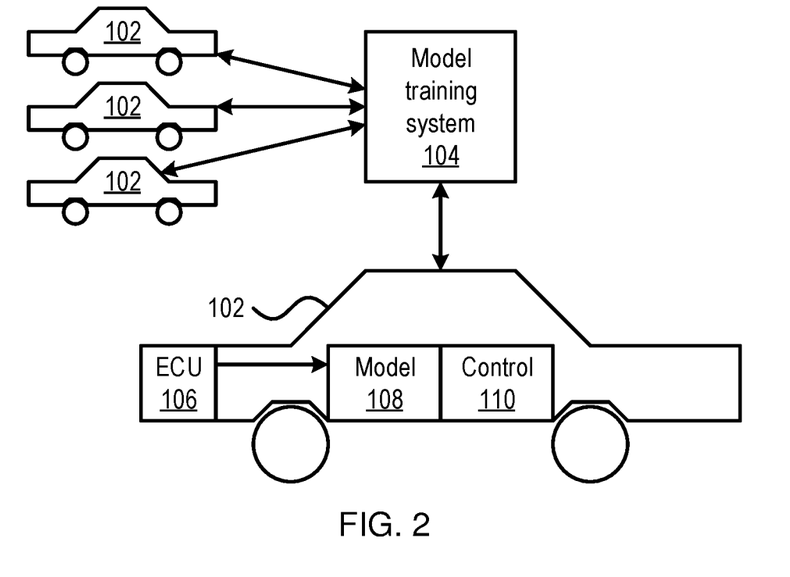
FIG. 2 is a diagram of a model training system that uses training data from a number of vehicles to generate a fault detection model that is transmitted to a vehicle, in accordance with an embodiment of the present invention.

Referring now to FIG. 2, an example of a fault detection model training system 104 is shown. The model training system 104 collects information from multiple vehicles 102. This information may be, for example, collected from ECUs 106 within the vehicles 102 and may represent time series information. Such time series information may include respective series of measurements or reports, made by an ECU over time. Thus, each ECU 106 may generate information that relates to a respective sub-system, which may be correlated with the information from other ECUs according to the time of measurement.

Training data may be labeled in a supervised or unsupervised manner. For example, a domain expert may manually label data according to whether that data reflects normal operation or a known fault state of a vehicle sub-system. In another example, data may be automatically labeled using unsupervised methods, such as an unsupervised clustering process.

After the model training system 104 has trained a fault detection model using the training data, the trained model may be distributed to the vehicles 102. Thus, the vehicles 102 may have their own local copy of the model 108. As new time series information is generated by the ECUs 106, the model 108 may make determinations as to whether the time series information predicts normal operation or a fault condition. A controller 110 may then take action based on the prediction, for example acting to prevent damage from a fault.

It should be understood that the vehicles that supply the training data may be different from the vehicles 102 that implement the trained model. In some cases, the vehicles 102 may all be of the same model, so that the trained model 108 may be specific to a particular model of vehicle. In some cases, the vehicles 102 may be of different models, so that the trained model 108 may be general and effective across multiple different vehicles models. In some cases, the model 108 may be updated after its initial implementation, as additional training data is provided to the model training system 104. Thus, the model 108 may be installed at the vehicle 102 at the time of the vehicle's manufacture or sale, may be transmitted to the vehicle 102 using a wired or wireless network connection, or may be transferred to the vehicle 102 at any other appropriate time and by any other appropriate process.

Although the present principles are described with respect to the specific example of ECUs in an automobile, it should be understood that this example is not intended to be limiting. Fault detection, as described herein, may be performed in any appropriate cyber-physical system. Furthermore, although the present principles are described in the context of distributed fault detection, it should be understood that the fault detection model 108 may also be housed in a central location, with operational information being transmitted to the central location for fault detection.

Figure 1:
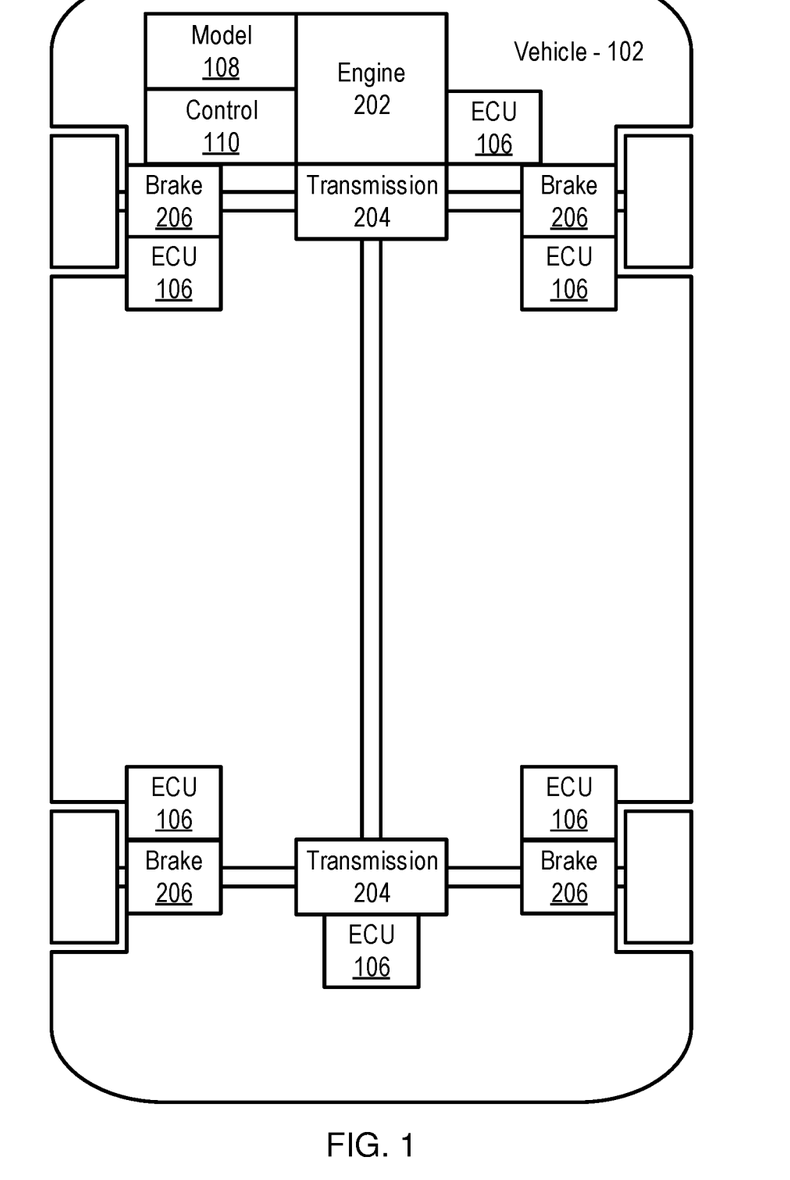
FIG. 1 is a diagram of a vehicle that uses a trained fault detection model to predict and correct faults in vehicle sub-systems, in accordance with an embodiment of the present invention.

Referring now to FIG. 1, additional detail on a vehicle 102 is shown. A number of different sub-systems of the vehicle 102 are shown, including an engine 202, a transmission 204, and brakes 206. It should be understood that these sub-systems are provided for the sake of illustration, and should not be interpreted as limiting. Additional sub-systems may include user-facing systems, such as climate control, user interface, steering control, and braking control. Additional sub-systems may include systems that the user does not directly interact with, such as tire pressure monitoring, location sensing, collision detection and avoidance, and self-driving.

Each sub-system is monitored by one or more ECUs 106, which perform measurements of the state of the respective sub-system. For example, ECUs 106 relating to the brakes 206 may determine an amount of pressure that is applied by the brakes 206, temperature of the brakes 206, and remaining usable lifetime of the brakes 206. The information that is gathered by the ECUs 106 is supplied to the controller 110.

Communications between ECUs 106 and the sub-systems of the vehicle 102 may be conveyed by any appropriate wired or wireless communications medium and protocol. For example, a car area network (CAN) may be used for communication. The time series information may be communicated from the ECUs 106 to the controller 110, and instructions from the controller 110 may be communicated to the respective sub-systems of the vehicle 102.

The controller 110 uses the fault detection model 108 to determine whether the time series information from the ECUs 106 is predictive of a fault. The new time series information is input to the model 108, and the model 108 outputs a label (e.g., "normal" or "fault") that may include an indication of a sub-system that is responsible for a fault condition.

The controller 110 may communicate internally, to the sub-systems of the vehicle 102 and the ECUs 106, as well as externally, to the model training system 104. For example, the controller 110 may receive model updates from the model training system 104, and may furthermore provide collected time series information from the ECUs 106 back to the model training system 104. For example, in the event that the model 108 indicates abnormal behavior that does not conform to a recognized fault, the controller 110 may send the corresponding time series information back to the model training system 104, where it may be used to train future iterations of the model 108.

Figure 3:
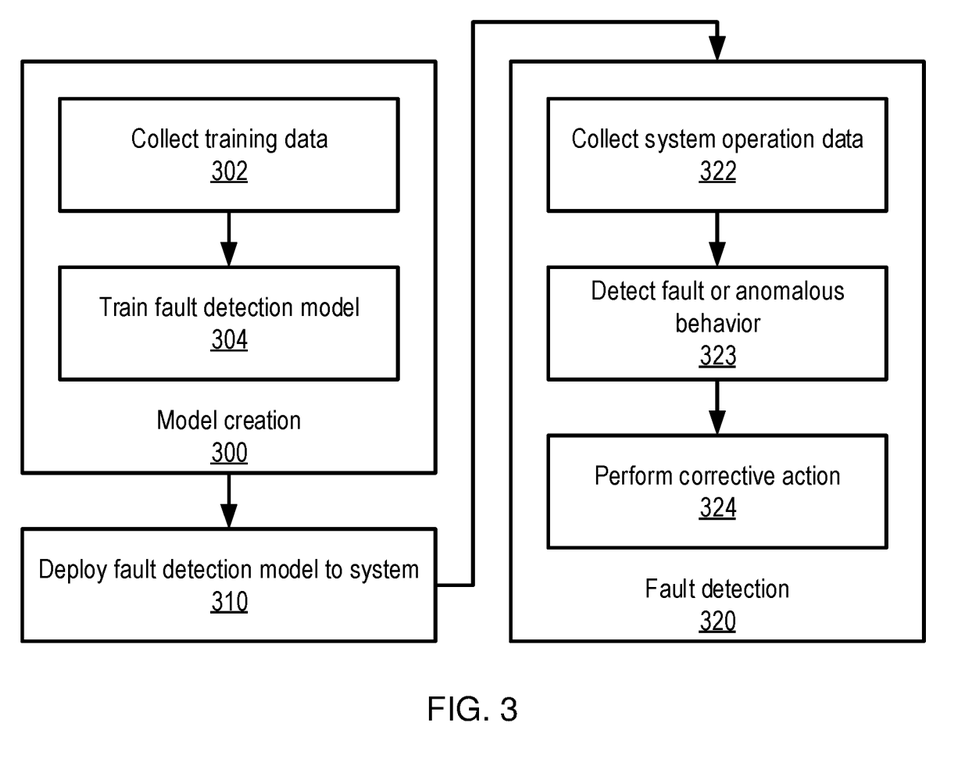
FIG. 3 is a block/flow diagram of a method for training and using a fault detection model, in accordance with an embodiment of the present invention.

Referring now to FIG. 3, a method for training and using a fault detection model is shown. Block 300 creates the fault detection model. Block 310 deploys the fault detection model to a system, such as a vehicle 102. Block 320 then uses the deployed fault detection model to detect a fault. Each of blocks 300, 310, and 320 may be performed by different entities, and each may be performed independently of the others.

Model creation 300 includes the collection of training data 302. This training data collection 302 may include receiving time series data from ECUs 106 of vehicles 102. The training data may be labeled by a domain expert or may be labeled in an unsupervised or semi-supervised manner. Thus, the training data may include time series information that is labeled as being "normal" or a "fault." The training data may be divided into segments, for example using a sliding time window to divide a time series into segments of a consistent time length. Model creation 300 then uses the training data to train a fault detection model in block 304, as will be described in greater detail below. The training of block 304 may include determining a graph that represents relationships between different ECUs 106.

Block 310 deploys the fault detection model to an appropriate system, such as a vehicle 102. This deployment can be performed using any appropriate wired or wireless communications medium and protocol. For example, deployment may be performed as part of an over-the-air update to a vehicle 102 using a mobile data network.

Block 320 performs fault detection at the deployed location. For example, block 322 may collect system operation data from the various sub-systems of a vehicle 102 using the ECUs 106. Block 323 detects fault or anomalous behavior, for example by using the collected system operation data as an input to the deployed fault detection model. As will be described in greater detail below, this detection may generate two distinct scores: a fault score, which may represent a similarity between the system operation data and a known fault, and an anomaly score, which represents dissimilarity between the system operation data and any known operational data pattern.

Block 324 then performs a corrective action, responsive to the detection of a fault or anomalous behavior. This corrective action may include, for example, notifying an operator of a potential fault or communicating with a service station to schedule maintenance. The corrective action may include, for example, an automatic action to correct or prevent the fault. Such automatic actions may include changing an operational status of one or more sub-systems, such as by changing the setting of one or more devices in the vehicle 102, stopping the engine 202, applying the brakes 206, applying a steering change, changing gears, and changing operational properties of the engine 202, transmission 204, or brakes 206 to compensate for an adverse condition.

Figure 4:
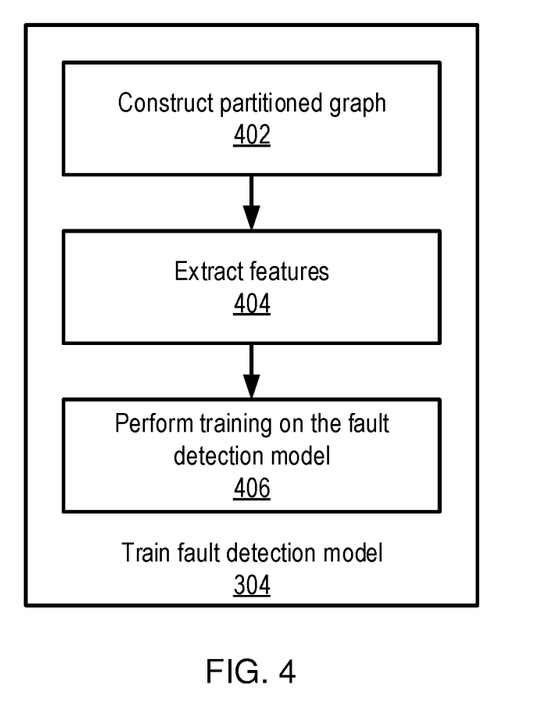
FIG. 4 is a block/flow diagram of a method of training a fault detection model, in accordance with an embodiment of the present invention.

Referring now to FIG. 4, additional detail on the training of the fault detection model in block 304 is shown. Block 402 constructs a relational graph among the sensors of the system. Block 402 then partitions the relational graph according to sub-systems. For example, the ECUs 106 of a vehicle may be grouped according to their respective sub-systems.

The raw sensor data from the ECUs 106 may not indicate what sub-system it pertains to. However, signals within a same sub-system may have stronger correlations with one another than they do with signals coming from a different sub-system. Partitioning in block 402 may therefore be performed using a correlation analysis on the sensor data, and can generate a correlation graph to represent the correlations among different ECUs 106. The clusters of ECUs 106 may then be associated with the different sub-systems.

This clustering may include a soft clustering approach to identify the sub-systems. For example, connecting nodes between two clusters may belong to both respective sub-systems. This reflects the fact that some ECUs 106 may be relevant to multiple sub-systems. For example, engine RPM information is a signal for the engine sub-system, but is also relevant to the gearing sub-system. If two signals have high correlation (e.g., correlated to a degree that is greater than a threshold value), then the graph may include an edge between the corresponding nodes.

Block 404 extracts features from the raw time series information and from the correlational graph. Two categories of features may be included, including values of the measured signals and correlations among the signals from different ECUs 106. For example, the measured signals may include engine RPM, temperature, and battery voltage, and the correlations may reflect that changes to one of these signals may correlate to changes in the others.

The values of the signals can be very dynamic during normal operation, and trends within a given signal may not be reliable. However, the correlations between different signals may be much more stable. A large change in the correlations between different signals may therefore denote an abnormal event.

Block 406 uses the extracted features of the labeled training data to train a machine learning model. It is specifically contemplated that the machine learning model may be implemented as an artificial neural network, as described in greater detail below. The model may be trained to generate two scores, including a fault score, which indicates a similarity of an input to fault training data, and an anomaly score, which indicates a dissimilarity of an input to normal training data.

Figure 5:
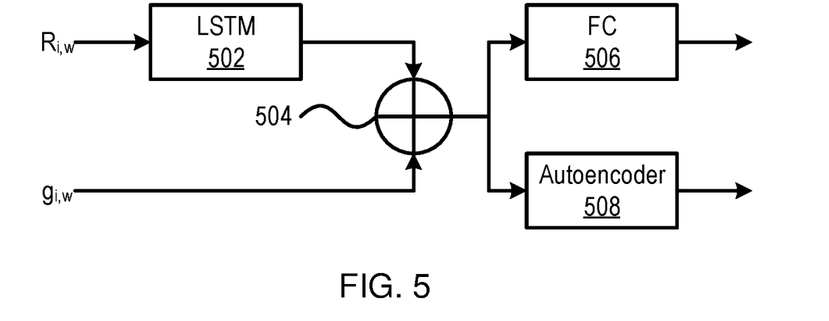
FIG. 5 is a block diagram of a fault detection model, in accordance with an embodiment of the present invention.

Referring now to FIG. 5, an exemplary neural network structure for a fault detection model 108 is shown. An input $X_{i,w}$ is split into two parts, including $R_{i,w}$ as the raw data from the ECUs 106, split into segments of an appropriate length, and $g_{i,w}$ as a correlation graph that captures correlations between the ECUs 106, where i represents a particular car and w represents a particular time window. A long-short term neural memory (LSTM) neural network layer 502 processes the raw data $R_{i,w}$. A concatenator 504 concatenates the processed raw data, output by the LSTM layer 502, with the correlation graph information $g_{i,w}$, to form feature embedding $h(X_{i,w})$.

An LSTM network is a variety of recurrent neural network (RNN) that stores information within the LSTM neurons for future use. Use of the memory may be controlled by the neuron's activation function. The use of this memory helps preserve gradient information during backpropagation. RNNs may be used to process sequences of information, such as an ordered series of feature vectors. This makes RNNs well suited to text processing and speech recognition, where information is naturally sequential. Each neuron in an RNN receives two inputs: a new input from a previous layer, and a previous input from the current layer. An RNN layer thereby maintains information about the state of the sequence from one input to the next.

The feature embedding $h(X_{i,w})$ may be used to generate two scores. A fully connected layer 506 takes the feature embedding as input, and generates a fault score that represents the similarity between the feature embedding and known fault training data that is used to train the fully connected layer 506. An autoencoder 508 takes the feature embedding as input, and generates an anomaly score that represents a dissimilarity between the feature embedding and known normal training data that is used to train the autoencoder 508.

Thus, if the anomaly score is low and the fault score is low, the system is operating normally. If fault score is high and the anomaly score is high, then a fault has been detected. If the anomaly score is high and the fault score is low, then the vehicle is in an unknown condition. Further monitoring may be needed, and additional information may be gathered and forwarded for analysis to better understand this new state. If the fault score is high, while the anomaly score is low, this indicates a problem with the model, and may trigger retraining. The state of the system can also be determined in terms of how the anomaly score and the fault score change over time. If the fault score is increasing, then a fault may be imminent and the operator may be alerted.

During the training of block 304, fault score losses and anomaly score losses may be considered jointly. For the fault score loss function, both normal training data and fault training data may be considered, providing a three-part loss function. For a system i in a normal operating state, the fault score $F(X_{i,w})$ should be low and should have small variation over time. Thus, a first fault loss component may be expressed as:

$$l_{f1} = \sum_{i \in N} \left( \eta \sum_{w} F(X_{i,w}) + (1-\eta) \sum_{w1,w2} |F(X_{i,w1}) - F(X_{i,w2})| \right)$$

where η is a weight parameter and N is a set of training datasets that represent a normal operating state. The first term of this component measures the absolute fault score across all time windows w, and the second term measures the differences between fault scores for all pairs of time windows w1 and w2.

For a car i in a fault state, the fault score $F(X_{i,w})$ may be non-decreasing, representing a degradation of the system's health. A second fault loss component may therefore be expressed as:

$$l_{f2} = \sum_{i \in F} \left( \sum_{w1 < w2} \max(F(X_{i,w1}) - F(X_{i,w2}), 0) \right)$$

where F is a set of training datasets that represent a fault operating state. When the fault score in window w1 is greater than the fault score of a later window w2, then the difference contributes to the loss. Otherwise, when the fault score increases between the two windows, the contribution is zero. The windows w1 and w1 may be consecutive, or may represent discontinuous periods of time.

To make sure that the maximum fault score of a system i in a fault state is larger than the maximum fault score of a system j in a normal operating state, a third fault loss component may be expressed as:

$$l_{f3} = \sum_{i \in F} \sum_{j \in N} \max\left( \max_w F(X_{j,w}) - \max_w F(X_{i,w}), 0 \right)$$

When the fault score of a vehicle in a normal operating state at any time exceeds the fault score of a system in a fault state, the difference between the fault scores contributes to the loss. Otherwise the contribution for those two cars is zero.

The total fault score loss may then be expressed as:

$$l_f = \alpha l_{f1} + \beta l_{f2} + (1-\alpha-\beta) l_{f3}$$

where α and β are hyperparameters.

The loss function for the anomaly score focuses on normal training data to measure deviations from normal behavior. Autoencoder networks may include two sections: an encoder section and a decoder section. The encoder section may create a relatively low-dimensional embedding of a relatively high-dimensional input, while the decoder section may recreate the original high-dimensional input. The autoencoder network is trained to recreate the original input as closely as possible. Such networks may be used in various ways. For example, the low-dimensional embedding may be used as a relatively compact representation of the original input. The high-dimensional output, meanwhile, may be used to reconstruct information from a noisy input.

The autoencoder 508 may therefore be used to generate a reconstruction of the feature embedding, AE $(h(X_{i,w}))$. The loss function for the anomaly score may therefore be the reconstruction error:

$$l_a = \|AE(h(X_{i,w})) - h(X_{i,w})\|_2$$

During training, adjustments may be made to the parameters of the LSTM layer 502, the fully connected layer 506, and the autoencoder 508 to jointly minimize these loss functions. A first set of training datasets (including both normal operating states and fault states) may be used to perform this training, while a second set of training datasets may be used to test the effectiveness of the trained fault detection model.

During fault detection, in block 323, a newly acquired set of data from the ECUs 106 may be used as input to the trained fault detection model to generate a new fault score and a new anomaly score. The corrective action 324 may be determined by comparing the dynamics of these two scores. If both scores are low, then the vehicle is in a normal operating state—no warning or action needs to be performed in block 324. If both scores are increasing, as compared to a previous measurement, this indicates that a fault is occurring, or may soon occur—the driver may be alerted in block 324, and an automatic corrective action may be performed.

In addition, the comparison of the fault score and the anomaly score may provide information on the efficacy of the fault detection model itself. For example, if the fault score stays low, but the anomaly score increases, then there may be other states to the system than were evidenced in the training data. These other states may not be close to normal operation, nor to any known fault conditions. In these cases, the measured information may be sent back to the model training system 104, where domain experts may provide an interpretation of the abnormal state, potentially adding the information to future training datasets.

If the fault score is high, but the anomaly score is low, then this may be a result of overfitting in the fault detection model. For example, if there are too few samples of fault states, or if the weight hyperparameter β is too small, the model may not be able to accurately distinguish between fault states and normal operating states. In such a case, the present operating conditions may be transmitted back to the model training system 104 and the training of the fault detection model may be adjusted accordingly.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 6:
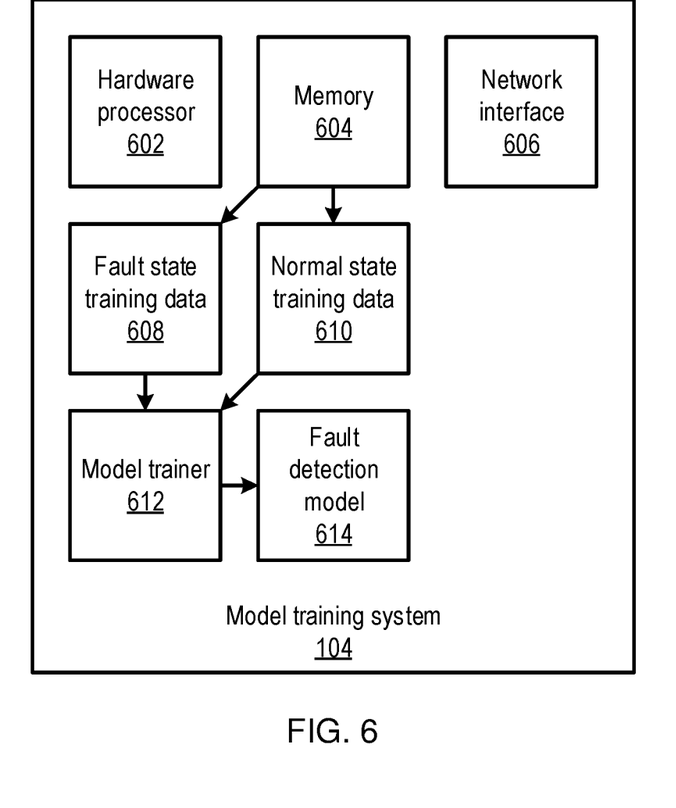
FIG. 6 is a block diagram of a fault detection model training system, in accordance with an embodiment of the present invention.

Referring now to FIG. 6, additional detail on the model training system 104 is shown. The system 104 includes a hardware processor 602 and a memory 604. A network interface 606 provides communications between the system 104 and one or more cyber-physical systems, such as vehicles 102. The network interface 606 may use any appropriate wired or wireless communications medium and protocol. The system 104 furthermore includes functional modules, which may be stored in the memory 604 as software and may executed by the hardware processor 602. One or more of the functional modules may be implemented as discrete hardware components, for example in the form of an ASIC or FPGA.

The memory 604 stores fault state training data 608 and normal state training data 610. Each of these sets of training data include datasets of time series information measured from exemplary cyber-physical systems. For example, the ECUs 106 of a set of vehicles 102, in known faulty or known normal operating states, may be tracked over time to generate respective fault state training data 608 and normal state training data 610. A model trainer 612 uses this information to train a fault detection model 614, such as the model 108 described above.

This fault detection model 614 may be transmitted to the different cyber-physical systems for implementation. For example, the network interface 606 may transmit the model 614 to a fleet of vehicles 102, for use during operation to identify and predict faults.

As noted above, the fault detection model 614 may be implemented as an artificial neural network (ANN), which is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Figure 7:
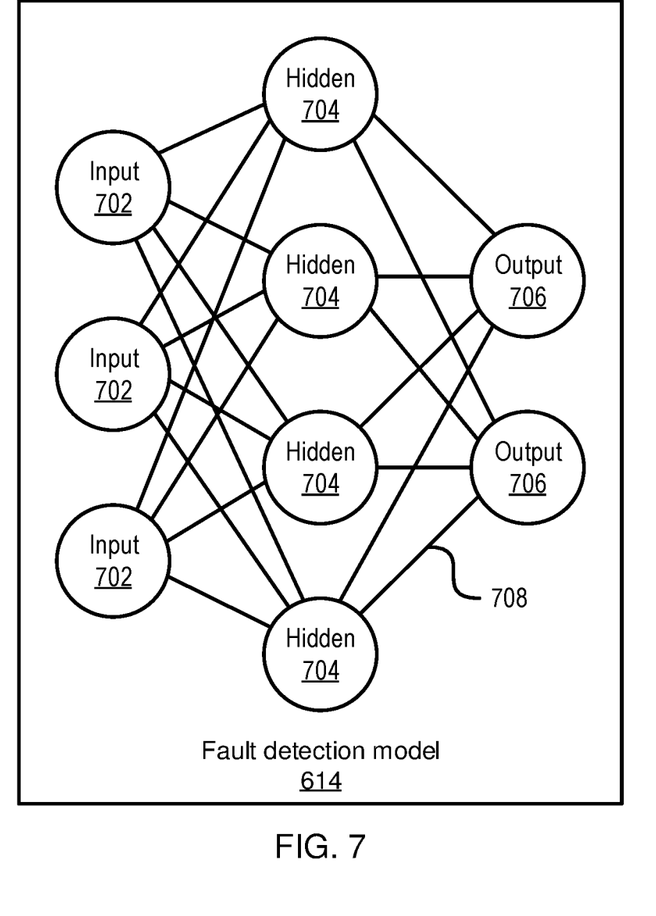
FIG. 7 is a block diagram of a fault detection model, in accordance with an embodiment of the present invention.

Referring now to FIG. 7, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 702 that provide information to one or more "hidden" neurons 704. Connections 708 between the input neurons 702 and hidden neurons 704 are weighted, and these weighted inputs are then processed by the hidden neurons 704 according to some function in the hidden neurons 704. There can be any number of layers of hidden neurons 704, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 706 accepts and processes weighted input from the last set of hidden neurons 704.

This represents a "feed-forward" computation, where information propagates from input neurons 702 to the output neurons 706. Upon completion of a feed-forward computation, the output is compared to a desired output available from training data. The error relative to the training data is then processed in "backpropagation" computation, where the hidden neurons 704 and input neurons 702 receive information regarding the error propagating backward from the output neurons 706. Once the backward error propagation has been completed, weight updates are performed, with the weighted connections 708 being updated to account for the received error. It should be noted that the three modes of operation, feed forward, back propagation, and weight update, do not overlap with one another. This represents just one variety of ANN computation, and that any appropriate form of computation may be used instead.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 708 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for vehicle fault detection, comprising:
   collecting operational data from a plurality of sensors in a vehicle, the plurality of sensors being associated with a plurality of vehicle sub-systems;
   concatenating data features from the operational data with a sensor correlation graph that includes indications of correlations between groups of related sub-systems;
   processing the concatenated data with a neural network to generate a fault score, which represents a similarity to fault state training scenarios, and an anomaly score, which represents a dissimilarity to normal state training scenarios;
   determining that the fault score is above a fault score threshold and that the anomaly score is above an anomaly score threshold to detect a fault; and
   performing a corrective action responsive the fault, based on a sub-system associated with the fault, selected from the group consisting of changing an operational status of one or more of the plurality of vehicle sub-systems, changing the setting of a device in the vehicle, stopping an engine of the vehicle, applying brakes of the vehicle, and changing operational properties of the engine, transmission or brakes of the vehicle to compensate for adverse conditions.

2. The method of claim 1, wherein collecting the operational data includes extracting data features from raw sensor data using a long-short term memory neural network.

3. The method of claim 1, wherein at least one node of the sensor correlation graph belongs to more than one group of related sub-systems.

4. The method of claim 1, wherein the neural network includes a fully connected layer to generate the fault score and an autoencoder to generate the anomaly score.

5. The method of claim 1, wherein the sensors monitor respective electronic control units of the vehicle to generate respective time series.

6. The method of claim 1, further comprising receiving parameters of the neural network from a remote neural network training system.

7. A vehicle, comprising:
   a plurality of sensors, each associated with a vehicle sub-system;
   a hardware processor; and
   a memory that stores computer program code, which, when executed by the hardware processor, causes the hardware processor to:
   collect operational data from the plurality of sensors;
   concatenate data features from the operational data with a sensor correlation graph that includes indications of correlations between groups of related sub-systems;
   process the concatenated data with a neural network to generate a fault score, which represents a similarity to fault state training scenarios, and an anomaly score, which represents a dissimilarity to normal state training scenarios;

determine that the fault score is above a fault score threshold and that the anomaly score is above an anomaly score threshold to detect a fault; and trigger a corrective action responsive the fault, based on a sub-system associated with the fault, selected from the group consisting of changing an operational status of one or more of the plurality of vehicle sub-systems, changing the setting of a device in the vehicle, stopping an engine of the vehicle, applying brakes of the vehicle, and changing operational properties of the engine, transmission or brakes of the vehicle to compensate for adverse conditions.

8. The vehicle of claim 7, wherein collecting the operational data includes extracting data features from raw sensor data using a long-short term memory neural network.

9. The vehicle of claim 1, wherein at least one node of the sensor correlation graph belongs to more than one group of related sub-systems.

10. The vehicle of claim 7, wherein the neural network includes a fully connected layer to generate the fault score and an autoencoder to generate the anomaly score.

11. The vehicle of claim 7, wherein the sensors monitor respective electronic control units of the vehicle to generate respective time series.

12. The vehicle of claim 7, further comprising receiving parameters of the neural network from a remote neural network training system.

13. A vehicle, comprising:
a plurality of sensors, each associated with a vehicle sub-system;
a hardware processor; and
a memory that stores computer program code, which, when executed by the hardware processor, causes the hardware processor to:
collect operational data from the plurality of sensors;
concatenate data features from the operational data with a sensor correlation graph that includes indications of correlations between groups of related sub-systems;
process the operational data with a neural network, which includes a fully connected layer to generate a fault score and an autoencoder to generate an anomaly score, wherein the fault score represents a similarity to fault state training scenarios and the anomaly score represents a dissimilarity to normal state training scenarios;
determine that the fault score is above a fault score threshold and that the anomaly score is above an anomaly score threshold to detect a fault; and
trigger a corrective action responsive the fault, based on a sub-system associated with the fault, selected from the group consisting of changing an operational status of one or more of the plurality of vehicle sub-systems, changing the setting of a device in the vehicle, stopping an engine of the vehicle, applying brakes of the vehicle, and changing operational properties of the engine, transmission or brakes of the vehicle to compensate for adverse conditions.

* * * * *